US005473808A

United States Patent [19]

Winters, Sr.

[11] Patent Number: 5,473,808

[45] Date of Patent: Dec. 12, 1995

[54] METHOD OF MAKING A BELLHOUSING

[75] Inventor: John F. Winters, Sr., Cocoa, Fla.

[73] Assignee: J. W. Performance Transmissions, Inc., Rockledge, Fla.

[21] Appl. No.: 290,056

[22] Filed: Aug. 15, 1994

[51] Int. Cl.[6] .......... B23P 17/00

[52] U.S. Cl. .......... 29/527.6; 7/606 R; 123/195 C

[58] Field of Search .......... 29/527.6; 7/606 R; 123/195 C

[56] References Cited

U.S. PATENT DOCUMENTS

| | | | |
|---|---|---|---|
| 1,824,440 | 9/1931 | Meyer . | |
| 3,455,409 | 7/1969 | Clark | 180/82 |
| 3,491,847 | 1/1970 | Abbott | 180/82 |
| 3,696,689 | 10/1972 | Sente et al. . | |
| 3,772,938 | 11/1973 | Johnson . | |
| 3,805,911 | 4/1974 | Le Salver | 180/91 |
| 3,841,290 | 10/1974 | Schvbeck . | |
| 4,308,931 | 1/1982 | Khanna | 180/235 |
| 5,193,415 | 3/1993 | Massel | 74/606 |
| 5,203,441 | 4/1993 | Monette | 74/606 R X |
| 5,299,880 | 4/1994 | Bouchard | 74/606 R X |

FOREIGN PATENT DOCUMENTS

| | | | |
|---|---|---|---|
| 56-159521 | 12/1981 | Japan | 123/195 C |
| 926206 | 5/1963 | United Kingdom | 74/606 |
| 1068405 | 5/1967 | United Kingdom | 74/606 R |
| 1247394 | 9/1971 | United Kingdom | 74/606 |

*Primary Examiner*—Carl J. Arbes
*Attorney, Agent, or Firm*—William M. Hobby, III

[57] ABSTRACT

A method of making an engine transmission bellhousing includes the steps of making the pattern for sandcasting a bellhousing having an engine attaching flange portion shaped to cover the engine bolt holes in a plurality of different engines, and making a mold using the pattern for sandcasting a bellhousing. Then selecting an aluminum alloy having the strength and characteristics selected to eliminate a bellhousing flexplate, which aluminum alloy includes aluminum alloyed with either zinc or silicon and selected other elements in lesser quantity and then casting the engine and bellhousing in the sand mold made with the bellhousing pattern. A plurality of flange bolt holes is formed in the flange of the bellhousing either as part of the casting or by a separate drilling operation with the predetermined bolt holes positioned for alignment with the engine bellhousing bolt holes in any one of a plurality of different engines with the remaining flange bolt holes not in alignment with the particular engine bellhousing bolt holes so that a cast bellhousing eliminates the flex plate and fits a plurality of different engines.

12 Claims, 1 Drawing Sheet

METHOD OF MAKING A BELLHOUSING

BACKGROUND OF THE INVENTION

The invention relates to a method of making an engine transmission bellhousing and especially to making an engine transmission bellhousing without a flex plate and which fits a plurality of engines.

One of the fastest growing sports in the world today is that of automobile racing. As modern technological improvements have leapt forward in areas of power plants, fuels, metallurgy and the like, competitive racing has employed vehicles of previously unknown performance incorporating a variety of components which are subjected to extremely high torque levels, parts turning ratios, high forces of kinetic energy absorption and extreme load bearing and handling characteristics.

Under the stress of such high vehicle performance during competition, component part breakdown is often occasioned, resulting in explosion, fire, fumes and immediate release of quantities of petroleum products such as oil and gas. Obviously, moving parts turning at a high r.p.m. constitute a particular hazard when parts failure occurs. One of the most sensitive components of a high performance vehicle is the transmission and the flywheel which form a part of the vehicle power drive train. Generally, when a part failure is experienced, the transmission housing and the flywheel bell housing are subjected to extremely high internal explosives pressures which cause the housing to shatter into shrapnel fragments moving at ballistic velocities and endangering both the driver and equipment. Furthermore, spectators to a competitive event may also be endangered by such shrapnel. Accompanying such an explosion is the presence of flames and fumes nourished by the onrushing airstream which is directed into the driver's cockpit of the vehicle.

Attempts have been made in the past to provide protection against the effects of explosion by the use of steel or flexible shields. Such a device may be seen in U.S. Pat. No. 2,724,378 which discloses a device specifically adapted to act as a safety cover for an internal combustion engine. The cover is rigid and is pivotally mounted on top of the engine and provides for swinging about the pivot connection under the pressure of an internal explosion.

Other U.S. patents directed towards shields for a bellhousing in transmissions may be seen in the Massel U.S. Pat. No. 5,193,415, for a continuous radial shield for automobile transmissions and in the Clark U.S. Pat. No. 3,455,409, for a Transmission Shield. The Abbott U.S. Pat. No. 3,491,847, is for an Explosion Cover while the Le Salver U.S. Pat. No. 3,805,911, is a Vehicle Provided with an Energy Absorbing Device covering an engine drive unit. The Khanna U.S. Pat. No. 4,308,931, is a Guard for a Drive Shaft.

The present invention, on the other hand, deals with a replacement bellhousing especially for use in automobile racing which eliminates the need for the flex shield and simultaneously is adapted to fit a wide variety of engines in the replacement of the bellhousings that come on the engines. The present bellhousing covering the flywheel protects the occupant of a vehicle and others from the disintegration of the flywheel or other components within the bellhousing by the blocking and absorbing of the energy from exploding parts without having to have a flex shield to absorb the energy by the selection of materials which absorb the energy. The redesigning of the bellhousing allows the attachment to any one of a plurality of different engines without weakening the bellhousing.

SUMMARY OF THE INVENTION

A method of making an engine transmission bellhousing includes the steps of making the pattern for sandcasting a bellhousing having an engine attaching flange portion shaped to cover the engine bolt holes in a plurality of different engines, and making a mold using the pattern for sandcasting a bellhousing. Then selecting an aluminum alloy having the strength and characteristics selected to eliminate a bellhousing flexplate, which aluminum alloy includes aluminum alloyed with either zinc or silicon and selected other elements in lesser quantity and then casting the engine and bellhousing in the sand mold made with the bellhousing pattern. A plurality of flange bolt holes is formed in the flange of the bellhousing either as part of the casting or by a separate drilling operation with the predetermined bolt holes positioned for alignment with the engine bellhousing bolt holes in any one of a plurality of different engines with the remaining flange bolt holes not in alignment with the particular engine bellhousing bolt holes so that a cast bellhousing eliminates the flex plate and fits a plurality of different engines.

BRIEF DESCRIPTION OF THE DRAWINGS

Other objects, features, and advantages of the present invention will be apparent from the written description and the drawings in which.

DESCRIPTION OF THE PREFERRED EMBODIMENT

The present invention relates to a bellhousing housing bolts to the rear of an internal combustion engine used in automobiles, trucks, and the like and covers the drive shaft extending from the engine and the flywheel attached to the drive shaft. The bellhousing protects occupants or others from injury should the flywheel or other component therein disintegrate. When used on racing engines, flywheels tend to generate and store large amounts of energy in the centrifugal forces of the balanced and weighted flywheel and, at the same time, can disintegrate with large amounts of force which can result in breaking the conventional bellhousing and injuring the occupants of the vehicle. As a consequent, typical racing cars have a bellhousing having an added flex shield or protective cover to protect the vehicle occupant. The bellhousing may also cover other portions of the transmission, such as the torque converter for the transmission, and has the remainder of the transmission attached thereto.

Figure 1:
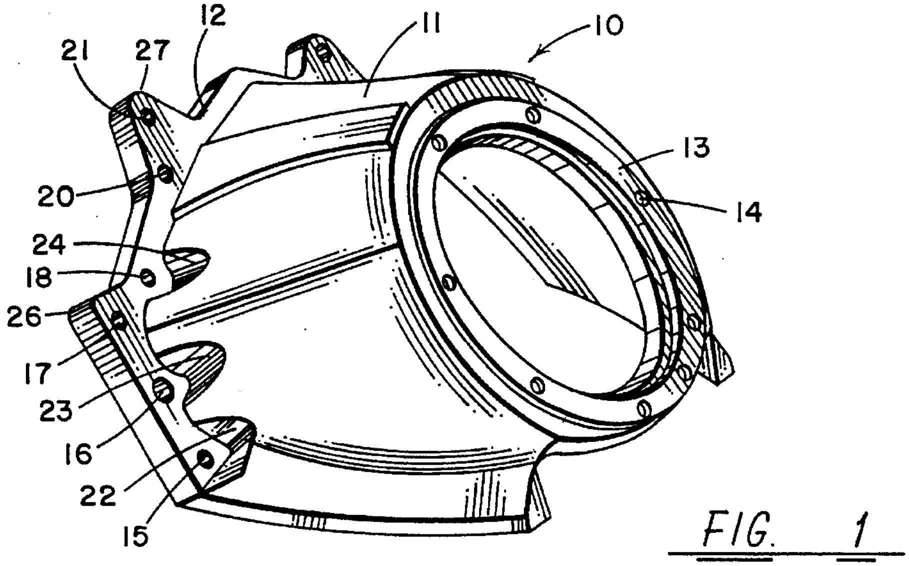
FIG. 1 is a perspective view of a bellhousing in accordance with the present invention.
Figure 2:
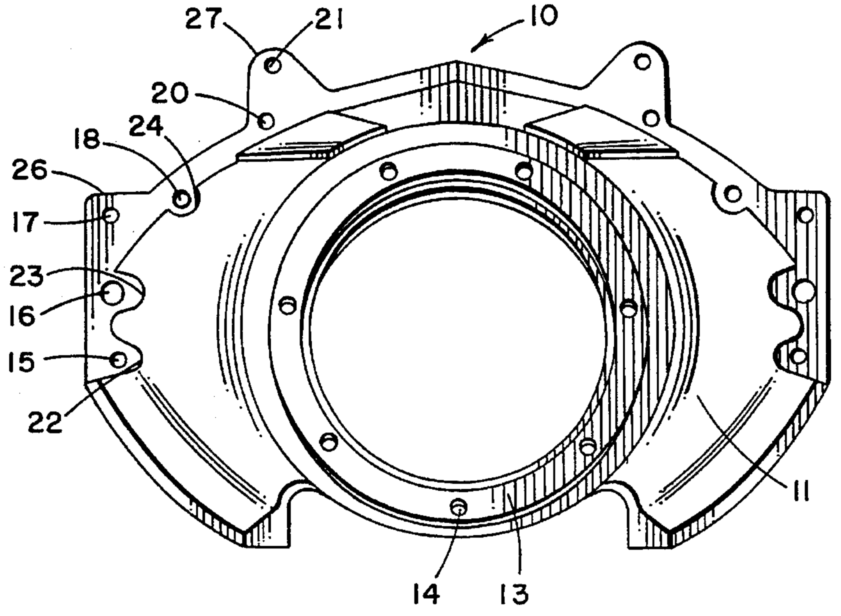
FIG. 2 is a front elevation of the bellhousing of FIG. 1.

The present bellhousing 10, as shown in FIGS. 1 and 2, has the main housing 11 with an irregularly shaped flange 12 which is adapted to attach to the rear of an engine into threaded bolt holes formed in the rear of the engine specifically located for attaching a bellhousing built for the engine. The bellhousing 10 has a transmission housing attaching surface 13 having a plurality of bolt holes 14 for attaching the remainder of the transmission to the bellhousing on one side while the flange 12 allows the bellhousing to attach the front of the transmission to the engine. The bellhousing, as shown in FIGS. 1 and 2, has matching holes on either side thereof including bolt holes 15, 16, 17, 18, 20 and 21, each one specifically positioned in place for fitting the bellhousing to predetermined engines. The engine bellhousing bolt openings match the openings on the bellhousing shown in FIGS. 1 and 2 in order to make the bellhousing fit the bolt holes. The bellhousing is made of a larger size with the cutouts 22, 23, and 24 and an expanded cusp 26 for the bolt holes 17 and an expanded cusp 27 for the bolt holes 21. It should be clear that the bellhousing designed for any particular engine block tends to be of a different size and, in addition, the placement of the bolt holes are different for different engines. In the present bellhousing, the opening 15 lines up and allows the bellhousing to be attached to a Chevrolet, Buick, Pontiac, or Oldsmobile whereas the opening 18 is for a two block dowel. The opening 17 fits only a Chevrolet type engine while the opening 18 fits only a Buick, Pontiac, and Oldsmobile engine as does the opening 21. The opening 20 fits only a Chevrolet engine. When the bellhousing 10 is attached to the block of a Buick, for instance, the openings that fits only the Chevrolet engine are covered by the attaching surface of the engine block and by the gasket so that they are sealed and do not weaken the bellhousing. When the bellhousing 10 is attached to a Chevrolet engine, the extra openings for a Buick are either covered and sealed with a gasket or, in the case of the expanded flange cusp 27, the hole may extend over and remain open on the outside of the bellhousing without allowing any ingress or egress to or from the inside of the bellhousing. The bolt openings 14 are for attaching the rest of the transmission.

In order to protect racing vehicles and the occupants thereof from the disintegrating flywheel being shielded by the bellhousing, the bellhousing, as illustrated, has eliminated the common flex plate or flex shield and uses an aluminum alloy which is sand cast from materials which absorb the energy from a disintegrating flywheel or other items within the bellhousing sufficiently as to not require a separate flex plate shield. When the bellhousings are made by sand casting, two separate alloys have been found to be of sufficient strength and have the characteristics needed, one of which has a large amount of zinc alloyed with the aluminum while the other has a large amount of silicon.

EXAMPLE 1

An aluminum alloy composition is selected which has the following percentages by weight of material added to aluminum to form an aluminum alloy.

Silicon 0.25

Iron (FE) 1.1

Copper (CU) 0.40–1.0

Magenese (MN) 0.6

Magnesium (MG) 0.20–0.50

Chromium (CR) 0.35

Nickel (NI) 0.15

Zinc (ZN) 7.0–8.0

Tin (TI) 0.25

This composition has a tensile strength of 35,000 psi; a yield strength of 25,000 psi; an elongation (percentage in two inches) of 5; a Burnell hardness of 75; shear strength of 26,000 psi; and an endurance limit of 9,000 psi.

EXAMPLE 2

An aluminum composition by weight includes

Silicon (SI) 6.5–7.5

Iron (FE) 0.20

Copper (CU) 0.20

Magenese (MN) 0.10

Magnesium (MG) 0.25–0.45

Zinc (ZN) 0.10

Tin (TI) 0.20

This composition has a tensile strength of 23,000 psi; a yield strength of 12,000 psi; an elongation (percent of 2 inches) of 6; and a Burnell hardness of 55.

The present invention deals with the method of making the bellhousing in accordance with the present invention and includes the steps of first making a pattern for a sand casting of a bellhousing having an engine attaching flange portion shaped to cover the engine bolt holes in a plurality of different engines and specifically covered the bolt holes in the engine block of Chevrolet, Buick, Pontiac and Oldsmobile engines without weakening the bellhousing or loosening the seal between the bellhousing and the engine. The next step is to use the pattern to make a mold for sandcasting the bellhousing; then selecting an aluminum alloy having a strength selected to eliminate the bellhousing flex plate, which selected aluminum alloy includes an alloy of aluminum having a large amount of zinc or, alternatively, having a large amount of silicon, and casting the engine bellhousing in the sand mold made with the bellhousing pattern and then forming a plurality of flange holes in the flange of the bellhousing with predetermined ones of the flange holes positioned for alignment with the engine bellhousing bolt holes in any one of a plurality of different engines, with some of the plurality of flange bolt holes being out of alignment with the engine bellhousing bolt holes of one or more of the engines so that the cast bellhousing eliminates the flex plate and fits a plurality of different engines. The step of forming a plurality of flange bolt holes includes having the bolt holes formed as part of the sand casting and, alternatively, having the holes drilled following the sand casting using a jig with prealigned drill bits for drilling holes in the precise aligned positions. In any event, part of the sandcasting then needs to be cleaned and polished for attachment to an engine and transmission. A selected aluminum alloy can be one having at least 5% zinc by weight but more on the order of 7 or 8% zinc or it can be an alloy having between 0.25 and 8% silicon, especially in the range of 7–8% silicon and which includes small percentages of iron, nickel, tin, Magenese, magnesium, and copper and which may include a small amount of chromium.

It should be clear at this time, that a new bellhousing has been provided especially for use in replacing existing bellhousings in racing engines, and the like, which advantageously eliminates the need for a flex plate by virtue of the tensile and yield strength as well as the elongation and hardness and which simultaneously fits a wide range of engines and transmissions. However, the present invention should not be considered limited to the forms shown which are to be considered illustrative rather than restrictive.

I claim:

1. A method of making an engine transmission bell housing comprising the steps of:

making a pattern for casting a bellhousing having an engine attaching flange portion shaped to cover the engine bolt holes in a plurality of different engines;

making a mold using the pattern made for casting a bellhousing;

selecting an aluminum alloy having a strength selected to eliminate a bell housing flexplate, said selected aluminum alloy including aluminum alloyed with zinc;

casting an engine bell housing in said mold made with said bell housing pattern; and forming a plurality of flange bolt holes in the flange of said bell housing with predetermined ones of said plurality of bolt holes positioned for alignment with the engine bell housing bolt holes in any one of a plurality of different engines and some of said plurality of flange bolt holes being out of alignment with the engine bell housing bolt holes of a plurality of engines, whereby a cast bell housing eliminates the flexplate and fits a plurality of different engines.

2. A method of making an engine transmission bell housing in accordance with claim 1 in which the step of selecting an aluminum alloy includes selecting an alloy of aluminum having at least 5% zinc.

3. A method of making an engine transmission bell housing in accordance with claim 1 in which the step of selecting an aluminum alloy includes selecting an alloy of aluminum having at least 1% iron.

4. A method of making an engine transmission bell housing in accordance with claim 3 in which the step of selecting an aluminum alloy includes selecting an alloy of aluminum having nickel, tin, Manganese and Magnesium alloyed therewith.

5. A method of making an engine transmission bell housing in accordance with claim 1 in which the step of selecting an aluminum alloy includes selecting an alloy of aluminum having at least 5% silicon.

6. A method of making an engine transmission bell housing in accordance with claim 5 in which the step of selecting an aluminum alloy includes selecting an alloy of aluminum having iron, copper, and tin alloyed therewith.

7. A method of making an engine transmission bell housing in accordance with claim 1 in which the step of making a pattern for casting a bell housing includes making a pattern having a flange having an irregular shape with extended cusps selected to cover bolt holes in each of a plurality of different engines.

8. A method of making an engine transmission bell housing in accordance with claim 1 in which the step of selecting an aluminum alloy includes selecting an alloy of aluminum having between 0.10 and 10 percent zinc.

9. A method of making an engine transmission bell housing in accordance with claim 1 in which the step of selecting an aluminum alloy includes selecting an alloy of aluminum having between 0.25 and 8 percent silicon.

10. A method of making an engine transmission bell housing in accordance with claim 8 in which the step of selecting an aluminum alloy includes selecting an alloy of aluminum having between 0.10 and 2 percent iron.

11. A method of making an engine transmission bell housing in accordance with claim 9 in which the step of selecting an aluminum alloy includes selecting an alloy of aluminum having between 0.2 and 1 percent copper.

12. A method of making an engine transmission bell housing in accordance with claim 11 in which the step of selecting an aluminum alloy includes selecting an alloy of aluminum having between 0.2 and 0.5 magnesium.

* * * * *